(12) United States Patent
Ver Hage (10) Patent No.: US 7,757,872 B2
(45) Date of Patent: Jul. 20, 2010

(54) REMOVABLE CAP ASSEMBLY WITH A SEALING RING AND STOPPER LOCK

(76) Inventor: Henry W. Ver Hage, 87 Chestnut St., Midland Park, NJ (US) 07432

(*) Notice: Subject to any disclaimer, the term of this patent is extended or adjusted under 35 U.S.C. 154(b) by 1544 days.

(21) Appl. No.: 10/992,608

(22) Filed: Nov. 17, 2004

(65) Prior Publication Data
US 2006/0102628 A1 May 18, 2006

(51) Int. Cl.
*B65D 39/00* (2006.01)
*B65D 43/10* (2006.01)
*B65D 43/08* (2006.01)

(52) U.S. Cl. .................. 215/229; 215/318; 215/357; 215/358; 220/254.2; 220/254.7; 220/259.3; 220/709

(58) Field of Classification Search .......... 215/364, 215/229, 318, 356–358; 119/72; 220/254.2, 220/254.7, 259.3, 709
See application file for complete search history.

(56) References Cited

U.S. PATENT DOCUMENTS

| | | | | |
|---|---|---|---|---|
| 1,351,496 A * | 8/1920 | Spooner | .................. | 215/329 |
| 2,052,496 A * | 8/1936 | Stassi | .................. | 215/229 |
| 2,765,950 A * | 10/1956 | Wheeler | .................. | 220/290 |
| 3,608,771 A * | 9/1971 | Monroe et al. | .................. | 220/266 |
| 3,874,541 A * | 4/1975 | Lagneaux et al. | .................. | 215/253 |
| 3,998,354 A * | 12/1976 | Song | .................. | 220/269 |
| 4,000,839 A * | 1/1977 | Tecco et al. | .................. | 222/540 |
| 4,190,173 A * | 2/1980 | Mason et al. | .................. | 220/203.05 |
| 4,226,334 A * | 10/1980 | Weiler et al. | .................. | 215/355 |
| 4,327,842 A * | 5/1982 | Walter | .................. | 220/254.7 |
| 4,482,070 A * | 11/1984 | Dubach | .................. | 215/253 |
| 5,065,909 A * | 11/1991 | Pino et al. | .................. | 222/484 |
| 5,433,330 A * | 7/1995 | Yatsko et al. | .................. | 215/247 |
| 5,462,181 A * | 10/1995 | Glynn | .................. | 215/204 |
| 5,513,762 A * | 5/1996 | Janani | .................. | 215/229 |
| 5,927,565 A * | 7/1999 | Paczonay | .................. | 222/484 |
| 6,062,440 A * | 5/2000 | Murray et al. | .................. | 222/464.1 |
| 6,345,741 B1 * | 2/2002 | Murray et al. | .................. | 222/464.1 |
| 6,422,412 B1 * | 7/2002 | Sagawa | .................. | 220/277 |
| 6,523,711 B1 * | 2/2003 | Hughes et al. | .................. | 220/709 |
| 6,536,618 B1 * | 3/2003 | Hwang et al. | .................. | 215/358 |

(Continued)

*Primary Examiner*—Anthony Stashick
*Assistant Examiner*—Ned A Walker
(74) *Attorney, Agent, or Firm*—Sofer & Haroun, LLP (57) ABSTRACT

A removable cap assembly maintains a cap having a curved side wall with an inner surface and an outer surface, a top portion extending from the curved side wall, a boss extending perpendicularly from the top portion, and a circumferential rib extending perpendicularly from the top of the boss. The boss and rib define an opening in the cap. A stopper, dimensioned to seal the opening, has a hole therein configured to allow a fluid to flow through. The stopper is maintained in the cap by the boss. The stopper includes a sealing surface flange and a cylindrical wall portion. The sealing surface flange receives the bottom edge of the boss. A sealing ring is formed separately from the stopper and is configured to fit against an inside surface of the top portion of the cap. A stopper lock is configured to press against the stopper, sealing surface flange and the sealing ring, sealing them against the inside of the cap. The stopper lock locks in place against the boss of the cap. An appliance member is adapted to be positioned within the hole of the stopper and extends through the opening.

7 Claims, 7 Drawing Sheets

U.S. PATENT DOCUMENTS

| | | | |
|---|---|---|---|
| 6,684,814 B1 * | 2/2004 | Ver Hage | 119/72 |
| 6,769,560 B1 * | 8/2004 | Lin | 215/361 |
| 6,786,179 B2 * | 9/2004 | Ver Hage | 119/72 |
| 6,915,920 B2 * | 7/2005 | Hwang et al. | 215/358 |
| 6,929,135 B1 * | 8/2005 | Hajianpour | 215/229 |
| 7,156,264 B2 * | 1/2007 | Ver Hage | 222/464.1 |
| 7,299,939 B2 * | 11/2007 | Ver Hage | 119/72 |
| 7,320,410 B2 * | 1/2008 | Ver Hage | 119/72 |
| 2003/0062331 A1 * | 4/2003 | Lin | 215/361 |
| 2003/0097994 A1 * | 5/2003 | Ver Hage | 119/72 |
| 2005/0236440 A1 * | 10/2005 | Cho | 222/519 |
| 2007/0175852 A1 * | 8/2007 | Hage | 215/229 |

* cited by examiner

REMOVABLE CAP ASSEMBLY WITH A SEALING RING AND STOPPER LOCK

FIELD OF THE INVENTION

This invention relates to an improved removable cap assembly for an animal feeding bottle.

BACKGROUND

Small rodents such as mice, rats, guinea pigs, and hamsters are used in scientific research and they are sometimes kept as pets by children. Typically, such animals are held in small cages where they are provided with nesting material along with food and water. Solid food is kept in a feeding device. So that the cage remains dry and relatively orderly, liquids, such as water and medicines, are usually stored in a special bottle with a dispensing device that allows small portions to be released to the animal.

A common type of dispensing device, widely used in the laboratory animal industry, is a sipper tube that is connected to a bottle filled with liquid. The tube points downward and is accessible to the animal. Often the hole in the tube is relatively small and, therefore, surface tension, along with a partial vacuum that is created in the bottle, prevents liquid from flowing freely from the bottle. Other sipper tubes include ball bearings disposed therein to block the hole at the bottom of the tube. The bearing is free to move, and when it does, it allows liquid to exit in a controlled manner.

In the prior art, it is well known that a sipper tube—such as the one just described, can be coupled to a bottle with a stopper made of rubber, neoprene, or another similar material. The stopper is placed in the mouth of the bottle where it is held by friction fit. Similarly, a hole in the stopper is dimensioned to hold the sipper tube by friction fit. With the bottle inverted, the sipper tube is accessible to an animal, and limited amounts of liquid can flow out of the bottle as needed.

The use of a simple friction fit between the stopper and the bottle has at least one major limitation. Because the bottle is inverted, the weight of the liquid tends to loosen the stopper. Furthermore, the stopper is loosened by vibrations and motion caused by an animal using the bottle. These loosening effects may eventually cause the stopper to come apart from the bottle, allowing liquid to escape. In some cases, animals attempt and sometimes succeed in removing stoppers from the bottle. In order to avoid these potentialities, stoppers are usually inserted into the bottle by hand with relatively high force. However, this action may cause health problems, such as carpal tunnel syndrome, for a person who must repetitively insert stoppers into bottles. After all, typical laboratories utilize large quantities of these bottles and stoppers.

Thus, what is needed is an improved removable cap assembly that overcomes prior art limitations. Specifically, these limitations include the rigidity and security with which the sipper tube is held by a stopper in the bottle. Additionally, problems with regard to cleanliness stem from design features in the prior art.

SUMMARY OF THE INVENTION

It is one object of the present invention to provide an improved removable cap assembly for use in conjunction with a bottle.

It is another object of the present invention to provide an improved removable cap assembly that can be easily attached to and detached from a standard threaded bottle.

It is still another object of the present invention to provide an improved removable cap assembly that provides a relatively rigid support for a sipper tube.

It is yet another object of the present invention to provide an improved removable cap assembly that has multiple thread starts for use in conjunction with threaded bottle.

Thus, according to one embodiment of the invention, a removable cap assembly comprises a cap, a stopper and a sipper tube. A removable cap assembly is provided having a cap having a curved side wall having an inner surface and an outer surface. A top portion extends from the curved side wall and a boss extending perpendicularly from the top portion. A circumferential rib extends perpendicularly from the top of the boss, where the boss and rib define an opening in the cap and has an opening having a width and a height.

A stopper is dimensioned to seal the opening. The stopper has a hole therein and is configured to allow a fluid to flow therethrough. The stopper is maintained in the cap by the boss. The stopper includes a sealing surface flange and a cylindrical wall portion. The sealing surface flange is dimensioned to receive the bottom edge of the boss. A sealing ring is provided, formed separately from the stopper and configured to fit against the inside surface of the top portion of the cap.

A stopper lock is configured to press against the stopper, sealing surface flange and the sealing ring, sealing them against the inside of the cap. The stopper lock is further configured to lock in place against the boss of the cap. An appliance member is adapted to be positioned within the hole of the stopper and extends through the opening.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE INVENTION

Figure 1:
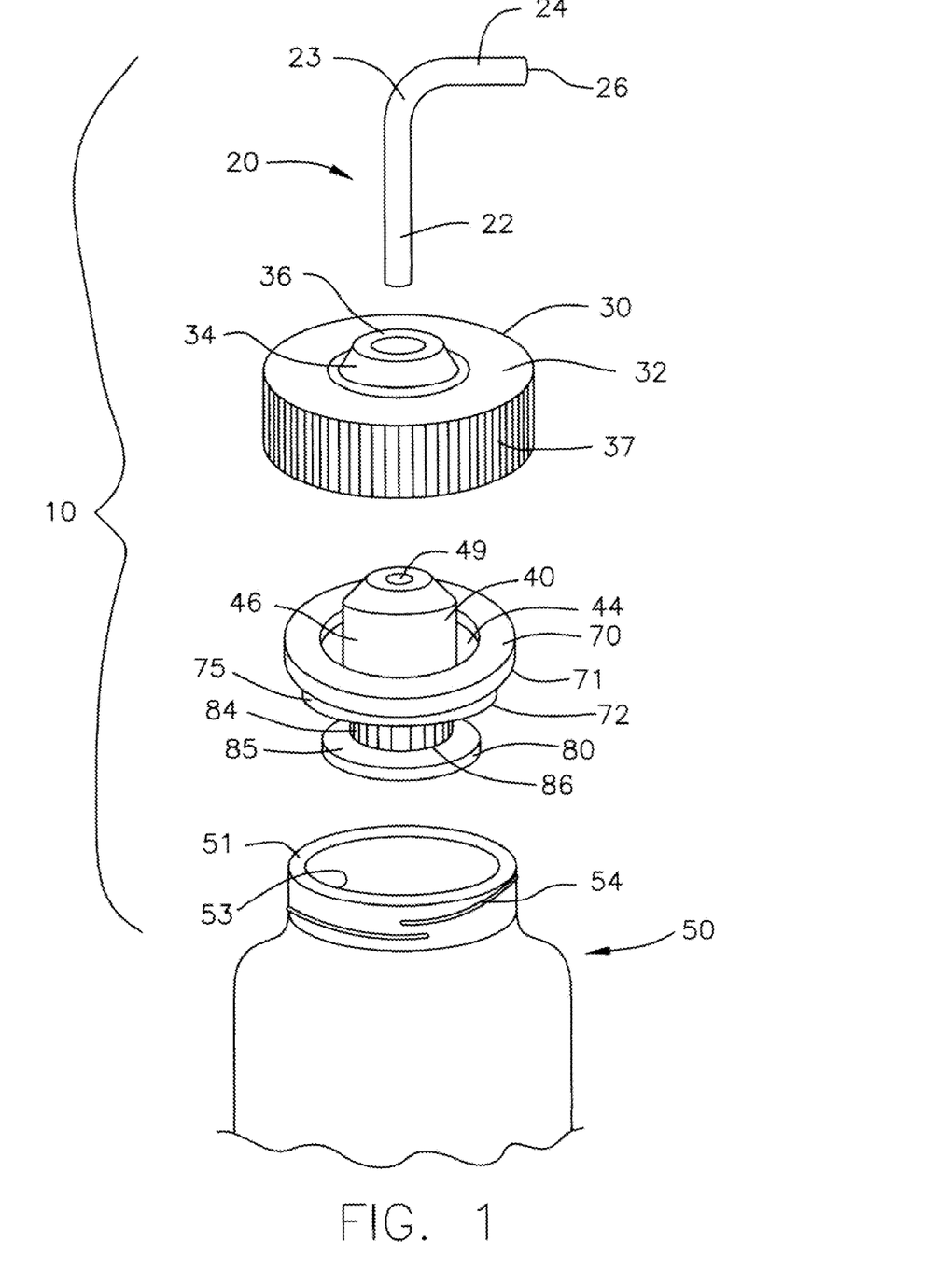
FIG. 1 is an exploded perspective view of a removable cap assembly constructed in accordance with one embodiment of the invention.

In accordance with one embodiment, the present invention is directed to a removable cap assembly 10. Certain features of the present invention, according to one embodiment, are shown in FIG. 1. Although not limited thereto, assembly 10 includes a sipper tube 20, a cap 30, a stopper 40, a sealing ring 70 and a stopper lock 80 that, together, can be coupled to a bottle 50. Stopper 40 fits in the cap to help provide a water tight sealing device for covering bottle 50. Tube 20 is then held by stopper 40 to provide an animal feeding bottle.

Sipper 20 can be one of many commercially available and well-known tube shaped devices that are designed to dispense small amounts of liquid on demand. The simplest of these devices, shown in FIG. 1, includes a vertical portion 22 and an angled portion 24 that is bent about an elbow 23. Tube 20 has a hole 26 at its end. The hole is dimensioned so that a relatively small amount of liquid can flow when the liquid's surface tension is broken. It is understood that many different types of sipper tubes can be used in conjunction with assembly 10 and the invention is not limited to use with tube 20 shown in FIG. 1.

Cap 30 is preferably formed of plastic, but it can also be formed from metal or any other appropriate material. Cap 30 includes a curved side wall 37. As shown in FIG. 1, wall 37 may include serrations on its outer surface in order to provide an improved gripping surface for a user. The inner surface of wall 37 is formed with threads so that cap 30 can be attached to bottle 50. Extending from wall 37 is a top portion 32 of cap 30.

Figure 2A:
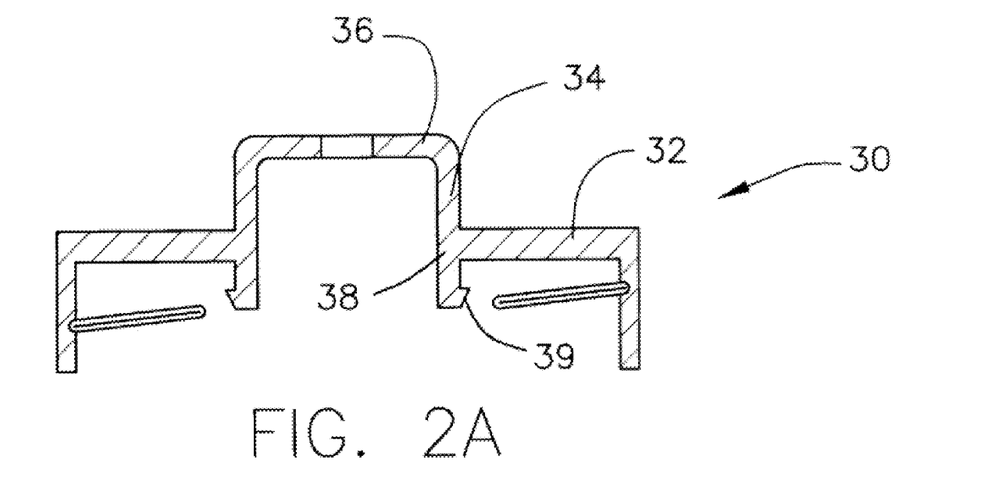
FIG. 2a is a cross sectional view depicting the cap of FIG. 1 detached from a standard threaded bottle, in accordance with one embodiment of the invention.

Now considering FIG. 2a along with FIG. 1, a boss 34 extends perpendicularly from top portion 32 and together they form a T-shape in cross section. Also, a circumferential rib 36 extends from the top portion of boss 34 and together they form an L-shape in cross section. A rigid cylindrical opening is defined by rib 36 allowing for sipper 20 to pass therethrough.

As illustrated in FIG. 2a, the bottom portion of boss 34, ends at an extension rim 38, configured to meet with a portion of stopper 40 to help seal the fluid within bottle 50. Stopper clips 39 are positioned on the outside surface of extension rim 38 configured to couple with a stopper lock 80, discussed in more detail below. Boss 34 preferably maintains 4 stopper clips 39 disposed at 90 degree intervals around its circumference, however, the invention is not limited in this respect.

Boss 34 and rib 36 serve multiple functions. Besides being configured to hold stopper 40, they cause the entire structure of cap 30 to be more rigid. At least one additional major advantage of the design herein described, is the cylinder shaped opening that is generally defined by boss 34 of cap 30. Unlike prior art caps, boss 34 provides lateral support for stopper 40. This support minimizes the range of motion of tube 20. In the prior art, a lack of support resulted in tube 20 being free to move in relatively unrestricted manner. This in turn may result in loosening the tube in the stopper. Other function and advantages of this design will be discussed below.

Figure 2B:
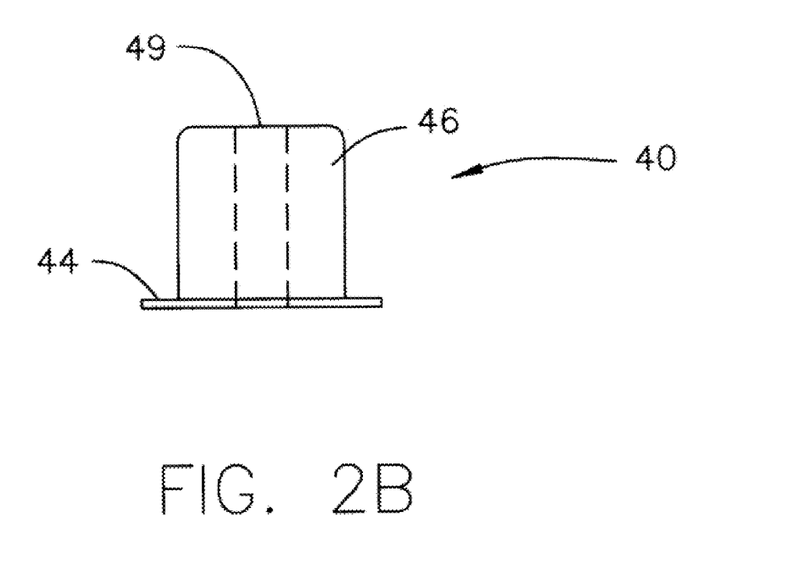
FIG. 2b is a cross sectional view depicting the stopper of FIG. 1 detached from a standard threaded bottle and configured to be coupled with the cap shown in FIG. 2a, in accordance with one embodiment of the invention.

As illustrated in FIGS. 1 and 2b, stopper 40 is formed from rubber, or a material with similar properties. A cylindrical wall portion 46 has a hole 49 which extends through the stopper as can be seen in FIG. 2b. A sealing ring flange 44 extends away from the bottom of wall portion 46 and is configured to correspondingly cover the bottom of extension rim 38 of boss 34 of cap 30. Stopper 40 maintains an overall dimension such that when it is placed within cap 30, cylindrical wall portion 46 fits flush against the inner wall of boss 34 forming a watertight seal.

Figure 2C:
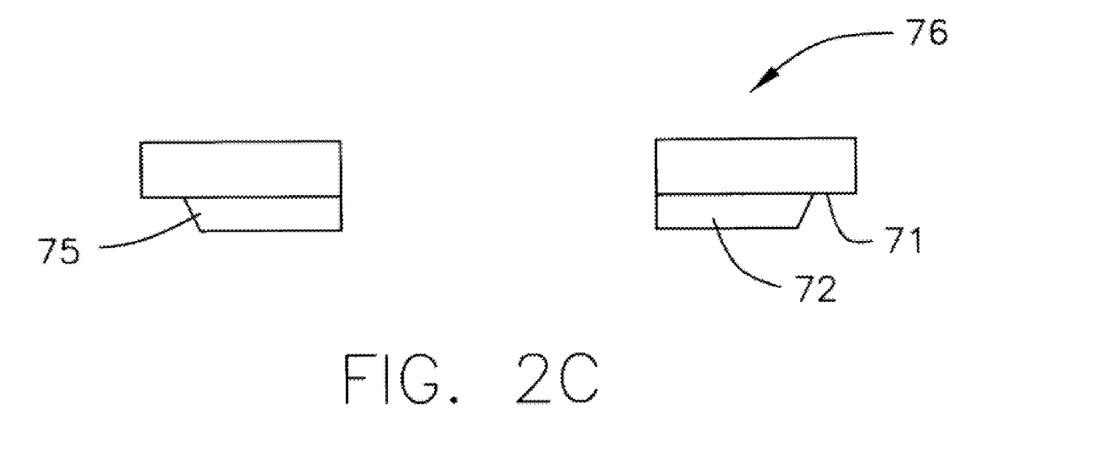
FIG. 2c is a cross sectional view depicting the sealing ring of FIG. 1 detached from a standard threaded bottle and configured to be coupled with the cap shown in FIG. 2a, in accordance with one embodiment of the invention.

As illustrated in FIGS. 1 and 2c, sealing ring 70, separately formed from stopper 40, is configured to compliment stopper 40 to complete the seal between cap 30 and bottle 50. The upper surface of sealing ring 70 is configured to fit onto the lower surface of top portion 32 of cap 30, outside of boss 34. Sealing ring 70 is dimensioned such that it can pass around extension rim 38 of boss 34 to fit flush up against top surface 32 of cap 30. Sealing ring 70 may be dimensioned so as to leave a gap between itself and extension rim 38 or, alternatively, it can be dimensioned to be flush against extension rim 38 as explained in more detail below.

Sealing ring 70 is preferably constructed of any elastomer capable of sealing fluid within bottle 50. For example, sealing ring 70 may be formed of rubber, plastic, silicone or any other similar material that can form a good seal against the inside of cap 30.

As shown in FIGS. 1 and 2c, a channel 75, with an upper surface 71 and a lower surface 72, is formed along the bottom of sealing ring 70 and the surfaces are dimensioned to respectfully receive an upper surface 51 and inner surface 53 of bottle 50.

Figure 2D:
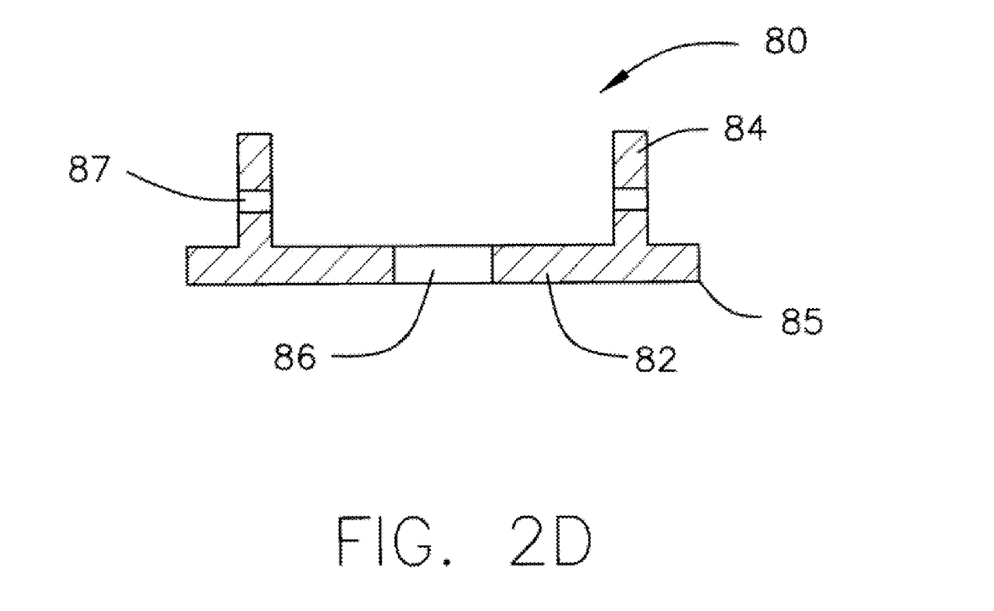
FIG. 2d is a cross sectional view depicting the stopper lock detached from a standard threaded bottle and configured to be coupled with the cap shown in FIG. 2a, in accordance with one embodiment of the invention.

As illustrated in FIG. 2d, stopper lock 80 is provided to hold stopper 40 within boss 34 and sealing ring 70 within cap 30. Stopper lock is preferably constructed of rigid material such as plastic or metal, however the invention is not limited in that respect. Stopper lock 80, maintains a flat base portion 82 with extending upper wall 84. A small segment of flat base portion 82 extends beyond upper wall 84 and forms an extension flange 85 that gives the stopper lock structure additional stability and gripping area.

Flat base portion 82 of stopper lock 80 is configured to fit against the bottom of stopper 40 and sealing ring flange 44. Upper wall 84 is configured to pass in a friction fit arrangement just outside of boss 34 and extension rim 38 of cap 30. As illustrated in FIG. 2d, stopper lock further maintains a sipper opening 86 in flat base portion 82 configured to allow sipper 20 to pass there through. Also, upper wall 84 maintains a series of locking notches 87 corresponding to stopper clips 39. As noted above, preferably stopper lock 80 maintains four locking notches 87 disposed about the circumference of upper wall 84 in 90 degree intervals, however the invention is not limited in that respect.

Figure 3A:
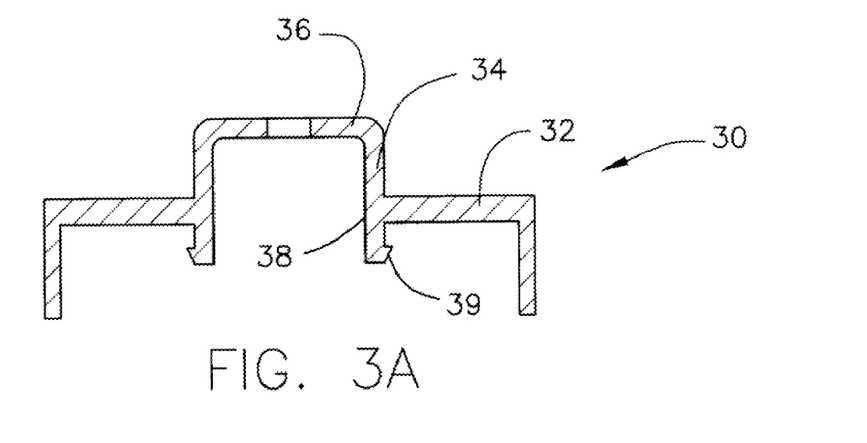
FIG. 3A is front view of the cap for receiving the stopper, sealing ring and stopper lock in accordance with one embodiment of the invention.
Figure 3B:
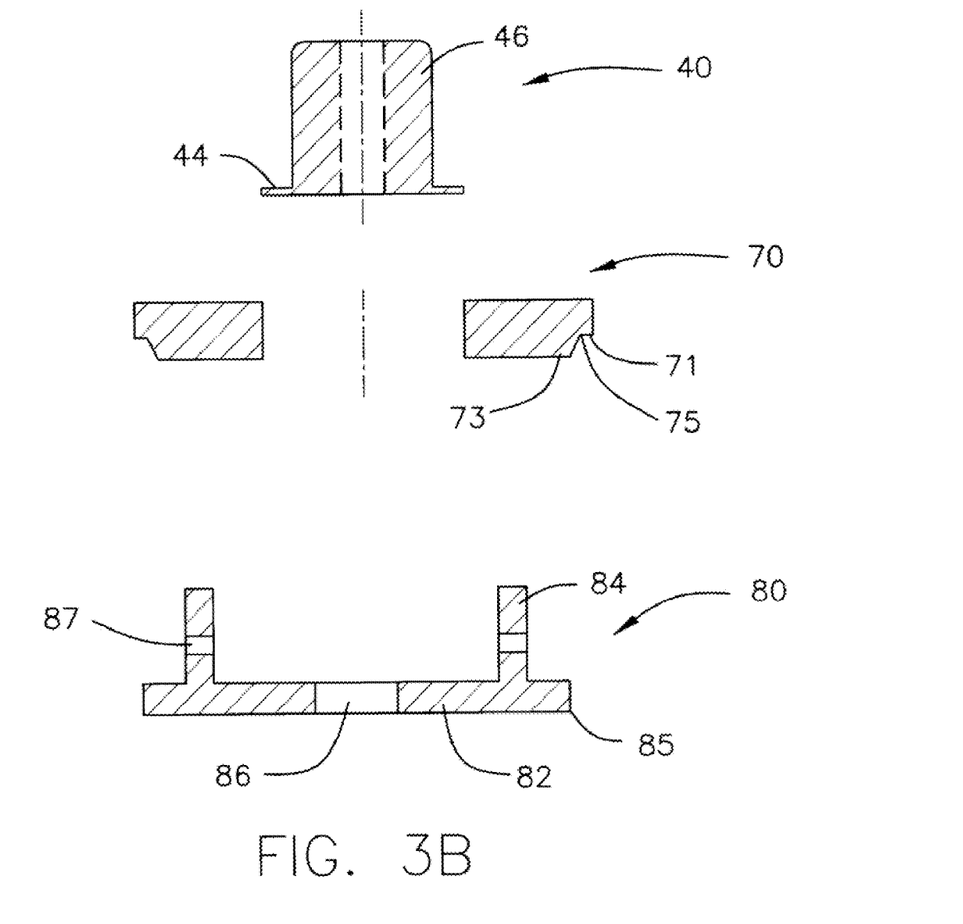
FIG. 3B is an exploded view of the stopper, sealing ring and stopper lock constructed in accordance with one embodiment of the invention.
Figure 3C:
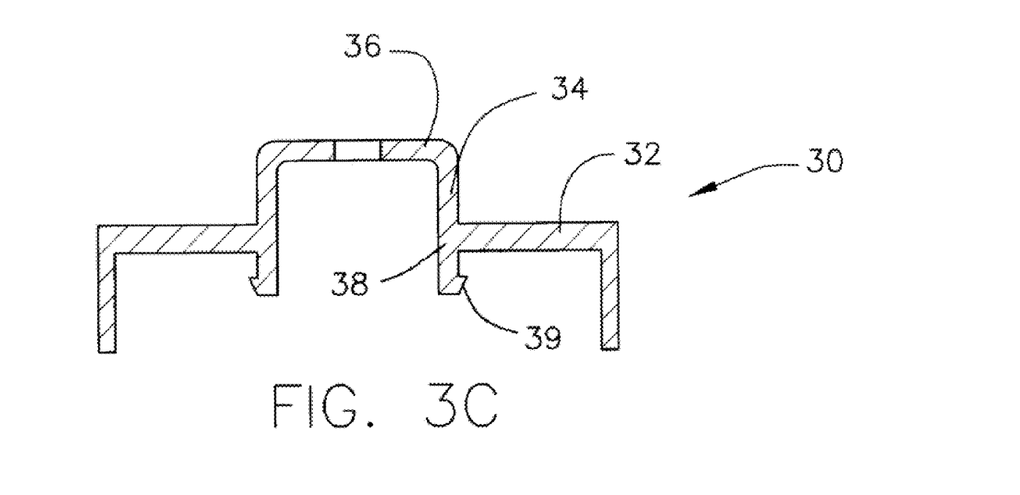
FIG. 3C is front view of the cap for receiving the stopper, sealing ring and stopper lock in accordance with one embodiment of the invention.
Figure 3D:
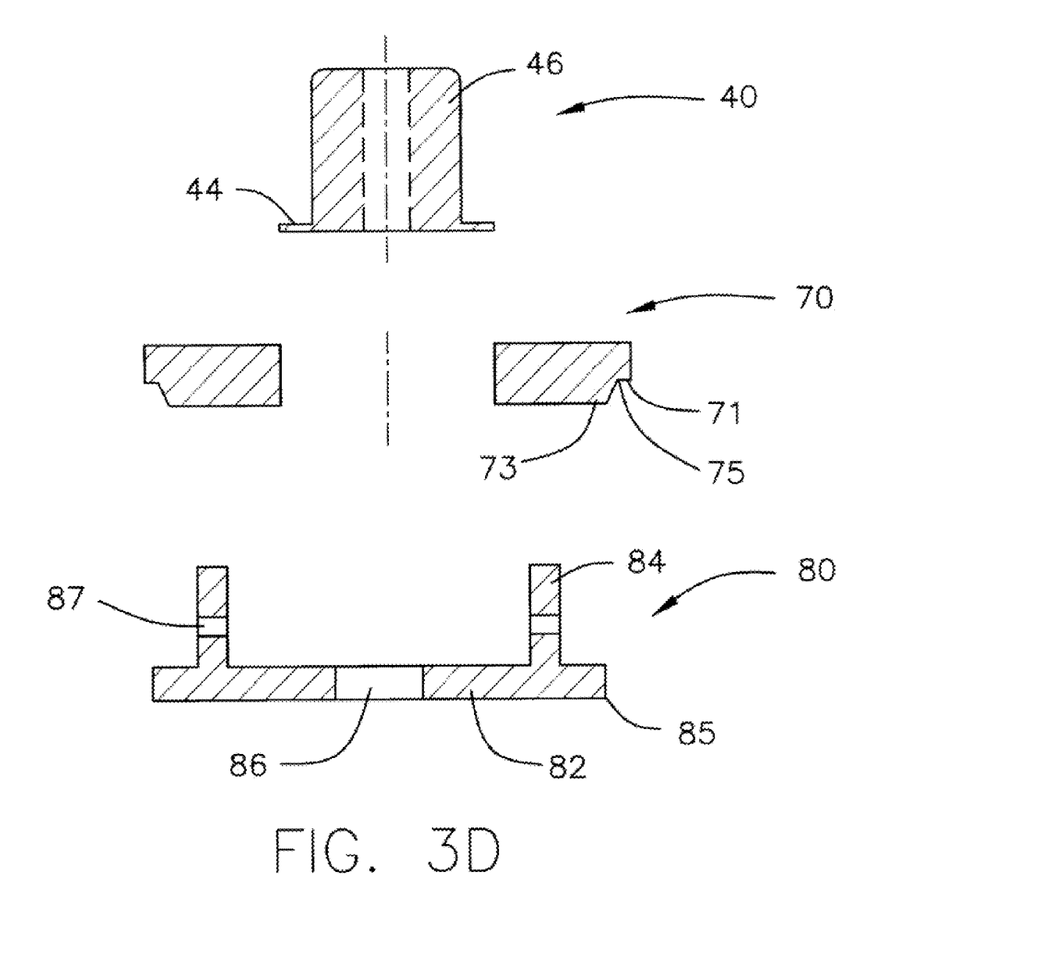
FIG. 3D is an exploded view of the stopper, sealing ring and stopper lock constructed in accordance with one embodiment of the invention.

To this end as is shown in FIGS. 3a and 3b, an exploded view of cap 30, stopper 40, sealing ring 70 and stopper lock 80 show their relative arrangement with one another. During assembly, stopper 40 is inserted into cap 30 such that cylindrical wall portion 46 fits flush against the inside wall of boss 34. Sealing ring flange 44 of stopper 40 is fit flush with the lower surface of extension rim 38 of boss 34.

Next, in first arrangement shown in FIG. 3a, sealing ring 70 is placed around extension rim 38 and boss 34 so that it lays flush in against the bottom of top portion 32 of cap 30, leaving gap between itself at the outside of extension rim 38. Stopper lock 80 is then placed into cap 30 over stopper 40 and sealing ring 70. The upper side of flat base portion 82 presses down against sealing ring flange 44 of stopper 40. Upper wall 84 passes just on the outside of boss 34 and extension rim 38 such that the top side of extension flange 85 presses sealing ring 70 against top portion 32 of cap 30. Stopper lock 80 is then pressed until locking notches 87 lock against stopper clips 39 on the outside of boss 34, completing the cap structure.

In a second alternative arrangement shown in FIG. 3b, sealing ring 70 is placed around extension rim 38 and boss 34 so that it lays flush in against the bottom of top portion 32 of cap 30, and also lying flush against the outside of extension rim 38. Stopper lock 80 is then placed into cap 30 over stopper 40 and sealing ring 70. Again, the upper side of flat base portion 82 presses down against sealing ring flange 44 of stopper 40. Upper wall 84 passes just on the outside of boss 34 and extension rim 38, but in this arrangement, the top side of upper wall 84 presses sealing ring 70 against top portion 32 of cap 30. Stopper lock 80 is then pressed until locking notches 87 lock against stopper clips 39 on the outside of boss 34, completing the cap structure.

In these arrangements, the pressure of stopper lock 80 holds both stopper 40 and sealing ring 70 firmly against the insides of boss 34 and cap 30, increasing the effectiveness of the seal. For the purposes of illustration only, it will be presumed that the first arrangement shown in FIG. 3a is being used for the following discussion.

Typically, cap 30, sipper tube 20, stopper 40, sealing ring 70 and stopper lock 80 are cleaned and sterilized as a single unit in an autoclave or other similar device. Because the plastic cap 30, metal sipper tube 20, stopper 40 and sealing ring 70 are constructed of different materials, they are likely to expand and shrink differently from one another as a result of the autoclave/sterilization process, causing gaps to form between the components. However, the present invention construction, in which stopper lock 80 presses tightly against stopper 40 and sealing ring 70, is better suited to retain the components in a close sealing relationship with one another during cleaning/sterilization, reducing the amount of gaps that form between the components. This feature assists in preventing unwanted contaminants from becoming trapped between the components.

Additionally, as stopper lock 80 is formed of a rigid material such as a plastic, sipper 20 is held in place by two rigid members, cap 30 and stopper lock 80, adding stability to the tube. In this arrangement, sipper 20 is secured relative to bottle 50 by both the opening in rib 36 of cap 30 and sipper opening 86 of stopper lock 80. This added stability prevents severe movements of the sipper tube during feeding, again preventing unwanted contaminants from getting between the components such as between the sipper 20 and stopper 40.

After assembly, when cap 30 is clamped down around bottle 50, the underside of sealing ring 70 compresses to provide a biasing force to separate cap 30 from the bottle 50. Sealing ring 70 seals against bottle 50 along two surfaces, as shown in FIG. 1, lower surface 72 of channel 75 engages inner surface 53 of bottle 50, and upper surface 71 engages upper surface 51 of bottle 50.

Figure 5A:
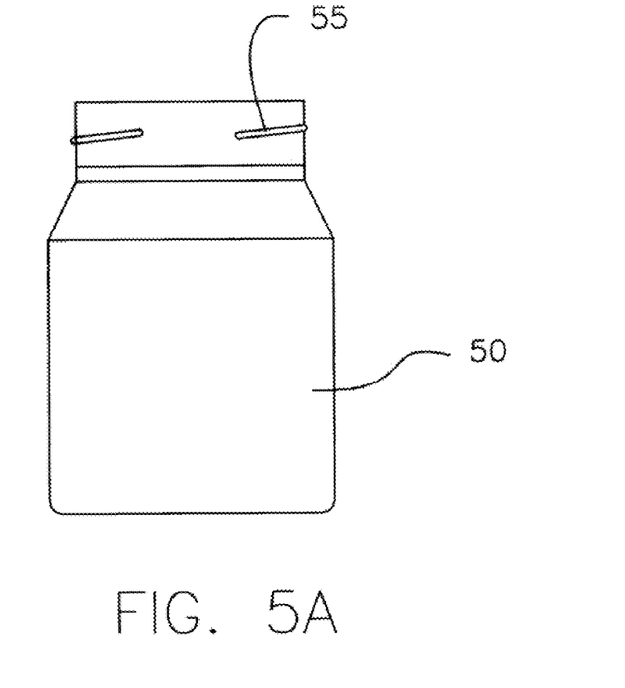
FIG. 5a is front view of a standard bottle, in accordance with another embodiment of the invention.
Figure 5B:
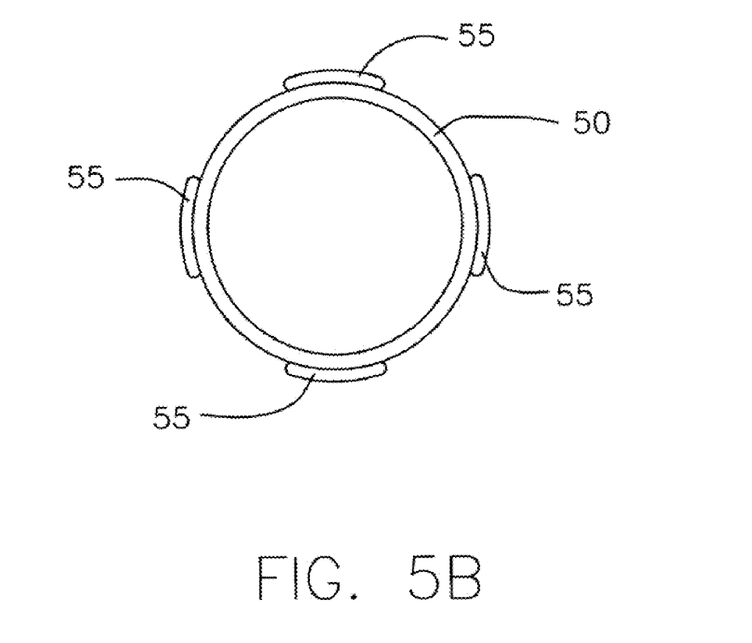
FIG. 5b is a top view of the standard bottle shown in FIG. 7a, in accordance with another embodiment of the invention.

In one embodiment, as shown in FIGS. 5a and 5b, four discreet threads 55 are disposed on bottle 50 and four corresponding threads are disposed on the inside of cap 30. It is understood that any number of threads may be disposed on bottle 50 and cap 30. The use of more than one non-continuous thread allows cap 30 to be tightened on bottle 50 with less than 360 degrees of turning. And, the use of multiple threads helps to create a seal along the full 360 degrees of cap 30.

Figure 4A:
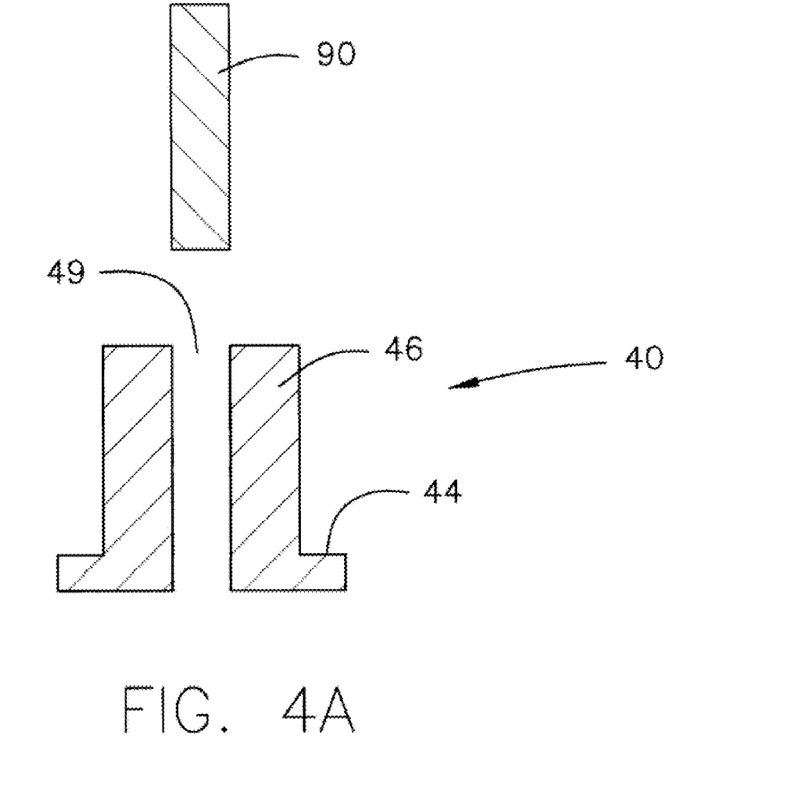
FIG. 4a is a cross sectional of a plug detached from the stopper shown in FIG. 3a, in accordance with one embodiment of the invention.
Figure 4B:
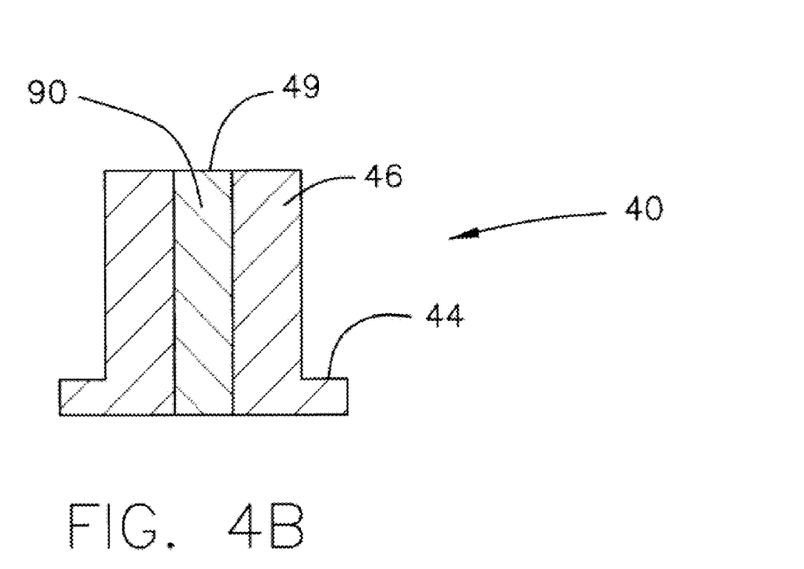
FIG. 4b is a cross sectional of a plug inserted into the stopper shown in FIG. 3a, in accordance with one embodiment of the invention.

As shown in FIGS. 4a and 4b, in another embodiment of the present invention, a plug 90 is configured to fit within hole 49 of stopper 40. Plug 90 may be used for initial storage and shipping, before sipper 20 is inserted through stopper 40. Additionally, some uses of cap assembly 10 may leave plug 90 in place permanently, allowing liquids to be consumed directly through small holes in bottle 50. As plug 90 creates an airtight seal with stopper 40 a vacuum within bottle 50 is formed, sufficient to prevent the liquid from continuously running out of bottle 50 through the small holes. In this arrangement cap assembly 10, with plug 90 inserted into stopper 40 are washed and sterilized, in a similar manner above. By leaving plug 90 permanently in stopper 40, and with stopper lock 80 pressing stopper 40 and sealing ring 70 into cap 30, the components, as above, remain resistant to gaps forming between themselves, preventing unwanted contaminants from collecting.

Also, the additional surface contact between cap 30 and stopper 40 serves to assure a water-tight seal. Another advantage of the presently described device is that the width of the opening formed in cap 30 for stopper 40 is relatively smaller than prior art openings. This is another factor which helps to improve the overall rigidity of assembly 10. Also disclosed have been features that were designed improve the overall cleanliness characteristics of a bottle feeder.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A removable cap assembly, comprising:
    a cap having a curved side wall having an inner surface and an outer surface, a top portion extending from said curved side wall, a boss extending perpendicularly from said top portion, a circumferential rib extending perpendicularly from said top of said boss, said boss and rib defining an opening in said cap, said opening having a width and a height;
    a stopper dimensioned to seal said opening, said stopper having a hole therein configured to allow a fluid to flow there through, said stopper being maintained in said cap by said boss, said stopper including a sealing surface flange and a cylindrical wall portion, said sealing surface flange dimensioned to receive the bottom edge of said boss;
    a sealing ring, said sealing ring formed separately from said stopper and configured to fit against an inside surface of said top portion of said cap;
    a stopper lock, said stopper lock configured to press against said stopper, sealing surface flange and said sealing ring, sealing them against the inside of said cap, said stopper lock, configured to lock in place against said boss of said cap; and
    an appliance member adapted to be positioned within said hole of said stopper and extending through said opening; and wherein said boss further comprises stopper clips spaced from said top portion of said cap, and wherein said stopper lock further comprises locking notches, said locking notches corresponding to said stopper clips so as to lock said stopper lock against said boss of said cap with said stopper and said sealing ring therebetween.

2. The assembly of claim 1, wherein said appliance member is a sipper tube.

3. The assembly of claim 1, wherein said appliance member is a plug.

4. The assembly of claim 1, further comprising a thread formed on said inner surface of said curved wall.

5. The assembly of claim 1, wherein said width of said opening is less than two times the height of said opening.

6. The assembly of claim 1, wherein said sealing ring further comprises a channel formed on its underside.

7. The assembly of claim 6, wherein said channel further comprises an upper surface and a lower surface, said upper surface of said channel dimensioned to receive an upper surface of a bottle and said lower surface of said channel dimensioned to receive an inner surface of a bottle to form a substantially tight seals therebetween.

\* \* \* \* \*